United States Patent [19]

Schumacher et al.

[11] 3,723,941
[45] Mar. 27, 1973

[54] MOUNTABLE SPRING WIRE GROUNDING CLIP

[76] Inventors: Walter C. Schumacher, 45 Ramblewood Dr., Warwick; Robert C. Cressman, 34 Tanglewood Dr., East Greenwich, both of R.I. 02889

[22] Filed: May 24, 1971

[21] Appl. No.: 146,136

[52] U.S. Cl..................339/14 R, 151/69, 151/41.75
[51] Int. Cl. .................................................H01r 3/06
[58] Field of Search ..339/14; 174/51; 151/69, 41.75; 24/218

[56] References Cited

UNITED STATES PATENTS 3,602,284   8/1971   Smith......................................151/69
2,861,618   11/1958  Tinnerman........................151/41.75

FOREIGN PATENTS OR APPLICATIONS 969,809   9/1964   Great Britain....................151/41.75
5,643     8/1909   Great Britain..........................24/218

Primary Examiner—Marvin A. Champion
Assistant Examiner—Robert A. Hafer
Attorney—Paul E. Rochford, Frank L. Neuhauser, Oscar B. Waddell and Joseph B. Forman

[57] ABSTRACT

Grounding connection between the mounting strap of a wiring device and the metal housing in which the device is mounted by the strap is achieved by means of a spring clip designed for use with the mounting strap to ensure continuity of electrical connection between the strap and metal housing.

1 Claim, 7 Drawing Figures

PATENTED MAR 27 1973　　　　　　　　　　　　　　　3,723,941

Inventors
Robert C. Cressman
Walter C. Schumacher

By Paul E. Rochford
Attorney

MOUNTABLE SPRING WIRE GROUNDING CLIP

The present invention relates to improved means for grounding connections between mounting strap of wiring devices and the wall boxes into which they are mounted.

Conventionally wiring devices are mounted in metal wall boxes and the like by means of metal screws which extend through openings provided at each end of a mounting strap to receiving threaded openings at the top and bottom or end of a metal wall box into which the wiring device is to be placed. It has been found, after a face plate is mounted on the wiring device and a permanent mounting completed at a wall location, that the mounting screw does not always have the desired contact with the mounting strap or bracket and accordingly that the grounding of the bracket through the screw to the wall box does not necessarily occur. The difficulty may be the result, for example, of the even spacing of the screw in the oversized opening at the end of the mounting bracket due to the realignment of the bracket and the screw supporting it as the face plate is fastened into place. The face plate is conventionally mounted onto the wiring device by means of screws which pass through appropriate holes in the face plate and attach to the mounting strap of the wiring device. A support for the device and its strap relative to the wall box may result as the edges of the face plate press against the wall to minimize the electrical contact between the mounting screw and the bracket.

Normally the mounting strap of a wiring device is formed of steel and where metal conduit or metal sheath enclosed wire is employed the mounting strap is grounded through the metal box and metal sheath or metal conduit. Alternatively, where the cable used has a grounding wire in the cable, connection of this wire directly to the box and grounding strap is performed during installation of the wall box. The problem of obtaining an adequate ground is accentuated where a grounding convenience outlet is to be mounted in a flush mounted metal box. In such case the grounding of the grounding prong of a three prong cap is to be made through the mounting screw by which the mounting strap is affixed to the wall box.

According to the National Electric Code, Article 250-74, the grounding of grounding type receptacles by grounding the mounting strap to the box with the mounting screws is not acceptable, except when the box in which the device is mounted is itself surface mounted, and except when contact devices or yokes designed and approved for this purpose are employed in an installation which is not surface mounted.

Except in the above cases, the National Electric Code requirement is that an independent connection as by means of a jumper wire or pigtail be made between the terminal screw of the grounding strap and the wall box itself.

Further, according to Article 370-10 of the National Electric Code relating to boxes and fittings, it is required that in a wall or ceiling mounting the outlet box may be set back a maximum of one-quarter inch from the finished surface of the mounting where the material of the wall or ceiling is a non-combustible material. For combustible materials, the box must be flush or extend beyond the finished surface. The above described mountings of metal boxes to receive wiring devices is the wiring scheme most commonly used and requires separate bonding at the terminal grounding screw of the device to the metal box or the use of an approved contact device or yoke.

It is accordingly one object of the present invention to provide a means for ensuring a grounding connection between a mounting strap and a grounded wiring device receiving box.

Another object of the present invention is to facilitate the grounding connections between screw members and conductive members with which they are associated.

Another object of the present invention is to provide a low cost element by which the grounding of threaded elements and associated metal elements may be accomplished.

Still another object of the present invention is to provide a combination of a screw member with an associated plate element and an element which ensures grounding contact there between.

Additional objects and advantages of the present invention will be in part pointed out and in part apparent from the description which follows.

In one of its broader aspects the objects of the present invention are achieved by providing a conductive metal strand of spring metal, said strand being formed into an upper oversized loop lying generally in an upper plane, said loop larger than the head of a screw associated therewith, said strand being formed into a lower undersized divided loop, said loop lying generally in a lower plane, said lower loop being connected to the upper loop and said lower loop being of a size smaller than the shank of a screw member with which it is associated, and the ends of said strand extending from the lower loop being bent upward and inward to grip a plate lying generally between the upper and lower planes.

The manner in which the present invention may be carried into effect will be clear from the description which follows taken in conjunction with the accompanying drawings in which.

Figure 1:
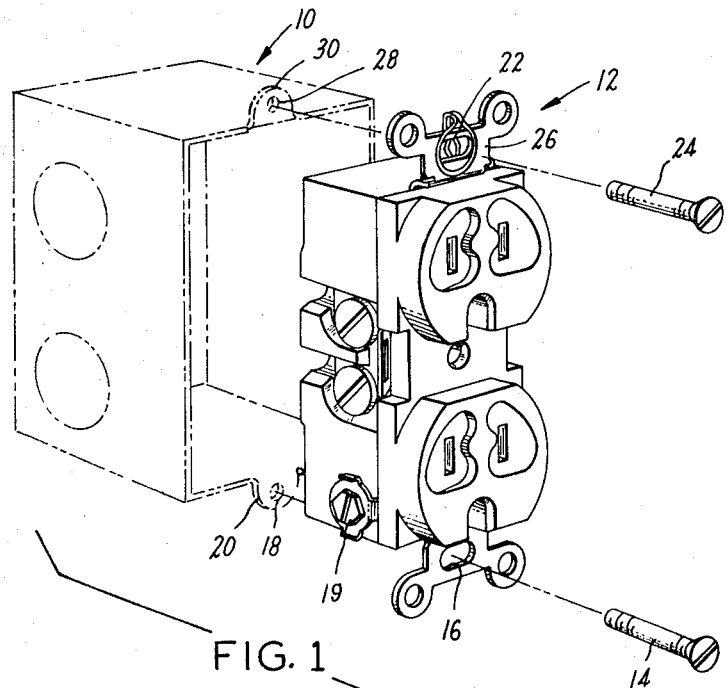
FIG. 1 is an exploded view of a duplex receptacle and wall box showing the relation of the clip of the present invention to the receptacle and wall box.

Referring first to FIG. 1 a metal wall box 10 shown in phantom is mounted in the normal fashion to receive a wiring device such as a duplex receptacle 12. In normal use the receptacle is mounted by passing a screw such as 14 through an opening 16 in the device mounting strap and threading it into the threaded opening 18 in tab 20 of wall box 10.

Pursuant to this invention the mounting is accomplished by passing a screw 24 through an oversize screw opening in bracket end 26, through wire clip 22, and into threaded hole 28 in metal tab 30 formed integrally with wall box 10.

Figure 2:
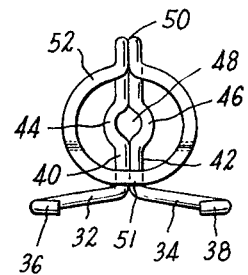
FIG. 2 is a detailed view of the clip of the present invention shown without reference to a mounting strap of a receptacle.
Figures 3, 4:
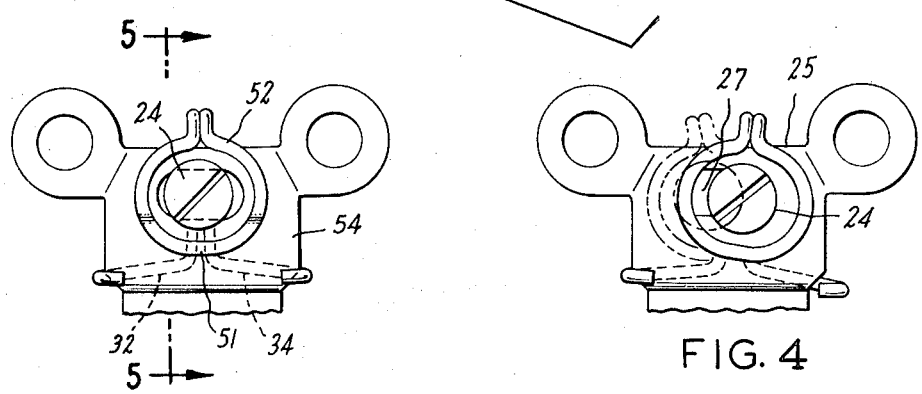
FIG. 3 is a similar view of the clip showing the relationship to a mounting strap.
FIG. 4 is a view of the device portion as shown in FIG. 3 but illustrating the flexibility and positioning the clip with reference to the screw and strap.

Turning now to the clip itself, the detailed form of the clip is shown in FIG. 2. As seen it is formed wire clip having two outwardly extending arms 32 and 34 with end claws 36 and 38 to engage the mounting bracket as best seen in FIGS. 3 and 4. Extending up from the arms 32 and 34 are the screw engaging strands 40 and 42 having divided loop grounding portions 44 and 46 to form a screw engaging opening 48 therebetween. The strands are then bent up at end 50 and are bent back into upper circular form loop 52 which loop is disposed on the top of the bracket where the screw head is located.

The operation of the clip with reference to a screw and a mounting bracket is one in which the clip ensures that there will be a good grounding contact between the screw and the bracket.

Figure 5:
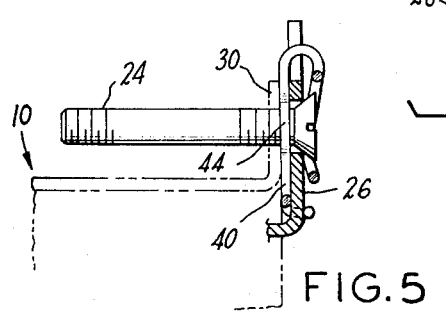
FIG. 5 is a view of FIG. 3 taken along the line A—A of FIG. 3 and showing the wall box in phantom.

The manner in which this is accomplished will be explained best with references to FIGS. 3, 4, and 5.

To begin with, and with reference made back first to FIG. 1, it will be seen that the screw 14 has a shank smaller than the size of the opening 16 in the mounting bracket of device 12. Thus it is possible for the screw to be centrally positioned in the opening 16 while threaded into threaded opening 18 and to make no grounding contact whatever with the bracket or any of the grounding portions of the device such as grounding screw 19 seen at the side of device 12.

Where grounding is not assured a "pig tail" connection between a grounding screw such as 19 and the wall box is necessary. Such connection is awkward, time consuming and expensive.

By contrast, pursuant to this invention grounding contact to the screw is ensured by the spring action of the arms 40 and 42 against the shank of the screw and particularly the rounded portions of split loop 44 and 46 against the side or threads of the shank of the screw. In other words there is a spring action tending to urge the two portions 44 and 46 of the split loop together and against the screw.

Similarly, there is a spring action tending to urge the upper round loop portion 52 of the spring clip downward against the upper surface 54 of the mounting bracket as shown in FIG. 3. There is correspondingly an upward pressure from strands 40, 42 adjacent the lower loop 44, 46 and from the arms such as arm 34 shown in phantom beneath the bracket surface 54. A good electrical contact is maintained by both the upward spring pressure such as that of arm 34 and the downward spring pressure of the circular upper loop portion 52 of the mounting clip. Such pressure would be present and such electrical contact maintained with the screw 24 is threaded all the way into the opening 28 or when it is only partially threaded into place is seen best with reference to FIG. 5 wherein the section of FIG. 3 taken along the line A—A of FIG. 3 is shown. As seen the screw is threaded into the opening in tab 30 as far as it can go and accordingly the bracket 26 is pressed against the strands 40 of the spring clip of the present invention. As explained above the curved portion 44 of the clip maintains electrical contact with the shank of the screw 24 regardless of whether the bracket 26 is pressed against the spring clip and in turn against the tab 30 or whether the screw is only partially threaded in so that it extends free of the bracket end 26.

Referring now to FIG. 4 the positionability of the screw in the extended slots 27 is illustrated. It is well known that the slots 27 are oversized both so that the screw may be positioned longitudinally and laterally a short distance from the geometric center of hole 16. The clip as described above overcomes both the loss of contact if the screw is located centrally of hole 16 and the poor contact if the contact of screw 24 with bracket end 26 is only slight rather than a firm contact ensuring good conduct of electricity between screw 24 and bracket end 26.

Figures 6, 7:
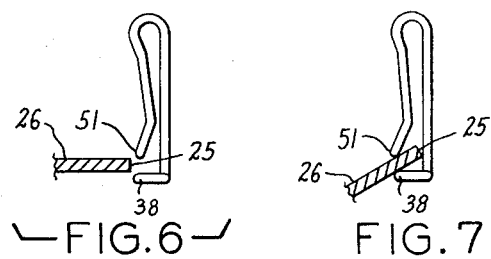
FIG. 6 is a side elevation, in part in section of the clip prior to mounting onto a mounting strap.
FIG. 7 is a similar view of the clip after mounting onto a mounting strap has been commenced.

Another feature of the clip of the present invention is shown and is now described with reference to FIGS. 6 and 7. Use of the clip of the present invention does not require construction of the special strap or modification of existing strap to accommodate the novel clip. Rather existing mounting straps can be employed and the clip can be used in connection therewith.

Further mounting of the novel clip of this invention onto such brackets is greatly facilitated because of the form of the clip. Thus referring again to FIGS. 6 and 7 it will be seen that the opening between the separated portions 51 and 38 of the clip is slightly larger than the thickness of strap 26. Accordingly end 25 of the strap 26 can easily be introduced into the clearance between the separated portions.

After the end 25 is introduced the mounting of the clip onto the strap end is facilitated by the wedging of the strap between the front larger loop of the clip of which lower edge 51 is part and the back strands of the clip of which end 38 is part. This wedging permits the large loop to be pried forward (to the left in FIG. 7) and permits the clip to be mounted on the strap by mannual pressure. No mounting tools or jigs are needed although for rapid mounting they are helpful.

What is claimed is:

1. A grounding clip comprising a formed strand of spring wire,
   said strand being formed into an upper oversized loop lying generally in an upper plane, said loop larger than the head of a screw associated therewith,
   said strand being formed into a lower undersized divided loop, said loop lying generally in a lower plane, said lower loop being connected to the upper loop and said lower loop being of a size smaller than the shank of a screw member with which it is associated,
   and the ends of said strand extending from the lower loop being bent upward and inward to grip a plate lying generally between the upper and lower planes.

* * * * *